US009685860B2

(12) United States Patent
Yin et al.

(10) Patent No.: US 9,685,860 B2
(45) Date of Patent: Jun. 20, 2017

(54) BUCK-BOOST CONVERTER AND METHOD FOR REGULATION

(71) Applicant: General Electric Company, Schenectady, NY (US)

(72) Inventors: Lanlan Yin, Shanghai (CN); Yifeng Sun, Shanghai (CN); Xing Tong, Shanghai (CN); Gang Wang, Plano, TX (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 14/535,348

(22) Filed: Nov. 7, 2014

(65) Prior Publication Data

US 2015/0171730 A1 Jun. 18, 2015

(30) Foreign Application Priority Data

Dec. 17, 2013 (CN) .......................... 2013 1 0692774

(51) Int. Cl.
*H02M 3/158* (2006.01)
*H02M 3/157* (2006.01)

(52) U.S. Cl.
CPC .......... *H02M 3/157* (2013.01); *H02M 3/1582* (2013.01); *H02M 3/1584* (2013.01)

(58) Field of Classification Search
CPC .. H02M 3/1582; H02M 3/1584; H02M 3/155; H02M 3/1588; H02M 3/158;

(Continued)

(56) References Cited

U.S. PATENT DOCUMENTS 6,469,482 B1 * 10/2002 Jahanshir et al. ............ 323/282
7,173,403 B1 * 2/2007 Chen et al. .................... 323/282

(Continued)

FOREIGN PATENT DOCUMENTS

CN      101212173 A      7/2008
CN      102694469 A      9/2012

OTHER PUBLICATIONS

Unofficial English Translation of Chinese Office Action and Search Report issued in connection with corresponding CN Application No. 201310692774.0 on Sep. 5, 2016.

*Primary Examiner* — Harry Behm
*Assistant Examiner* — Bryan R Perez
(74) *Attorney, Agent, or Firm* — GE Global Patent Operation; Stephen G. Midgley

(57) ABSTRACT

A buck-boost converter includes a buck-boost voltage converter circuit, an error controller and a buck-boost mode controller. The buck-boost voltage converter includes switches. The error controller is configured to provide a control signal based on a difference between an output voltage of the buck-boost voltage converter circuit and a reference voltage. The buck-boost mode controller determines switching duty cycles based on the control signal having at least three conditions: when DC is beyond a threshold value, apply one of buck regulation control and boost regulation control, where DC is a value of the control signal; when DC is not beyond and not substantially equal to the threshold value, apply the other of the buck regulation control and the boost regulation control; and when DC is substantially equal to the threshold value, apply buck-boost regulation control. The output voltage is regulated by the switching duty cycles.

6 Claims, 10 Drawing Sheets

(58) Field of Classification Search
CPC .... H02M 3/156; H02M 3/157; H02M 3/1563; H02M 2003/1557; H02M 2003/1566
See application file for complete search history.

(56) References Cited

U.S. PATENT DOCUMENTS

| | | | |
|---|---|---|---|
| 7,977,928 B2* | 7/2011 | Fahrenbruch et al. | 323/271 |
| 8,232,787 B2* | 7/2012 | De Cremoux | 323/284 |
| 8,368,365 B2* | 2/2013 | Canfield et al. | 323/259 |
| 2009/0003021 A1* | 1/2009 | Tsukamoto | 363/74 |
| 2010/0231189 A1* | 9/2010 | Chen et al. | 323/284 |
| 2010/0237836 A1* | 9/2010 | Fahrenbruch | H02M 3/1582 323/223 |
| 2010/0327833 A1* | 12/2010 | Singnurkar | 323/282 |
| 2011/0037446 A1* | 2/2011 | Engelhardt | H02M 3/1582 323/282 |
| 2011/0089915 A1* | 4/2011 | Qiu | H02M 3/1582 323/271 |
| 2011/0089917 A1* | 4/2011 | Chen | H02M 3/1584 323/282 |
| 2011/0156683 A1* | 6/2011 | Zhang et al. | 323/283 |
| 2011/0181266 A1* | 7/2011 | Minami et al. | 323/311 |
| 2012/0062030 A1* | 3/2012 | Xu et al. | 307/31 |
| 2012/0201053 A1* | 8/2012 | Lu | H01F 3/14 363/17 |
| 2012/0306463 A1* | 12/2012 | Athas | H02M 3/1588 323/271 |

* cited by examiner

Buck mode

Boost mode

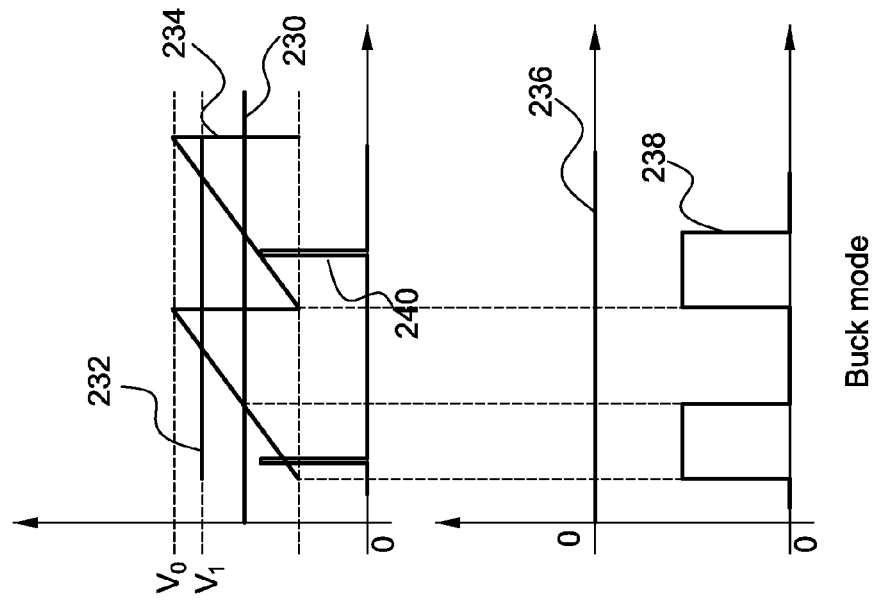
FIG. 9 Buck mode
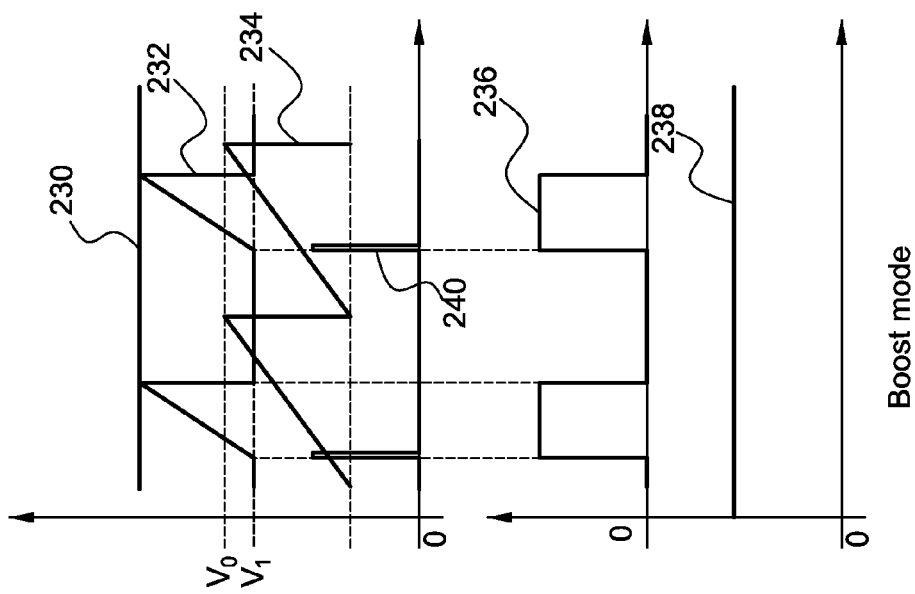
FIG. 8 Boost mode

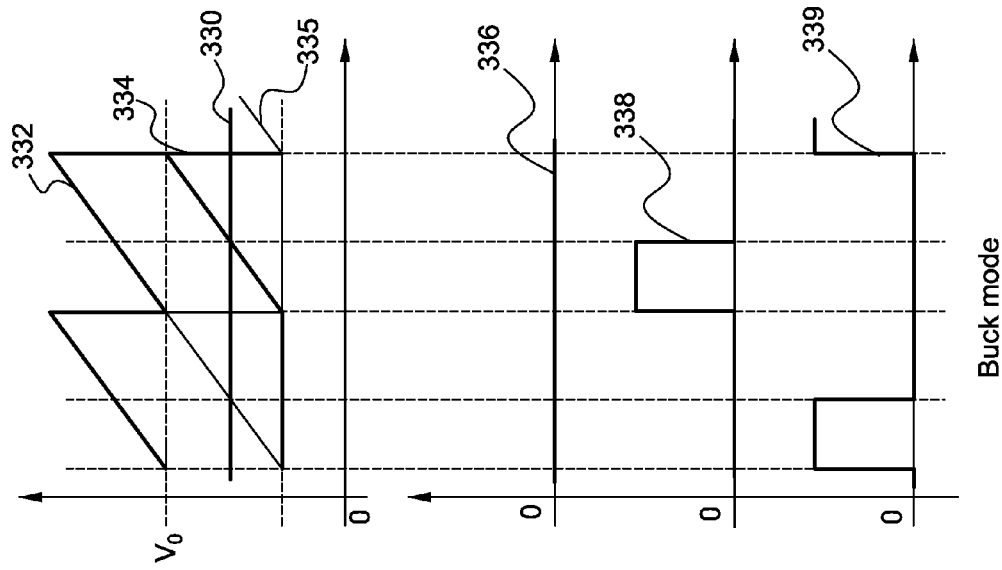
FIG. 13 Buck mode
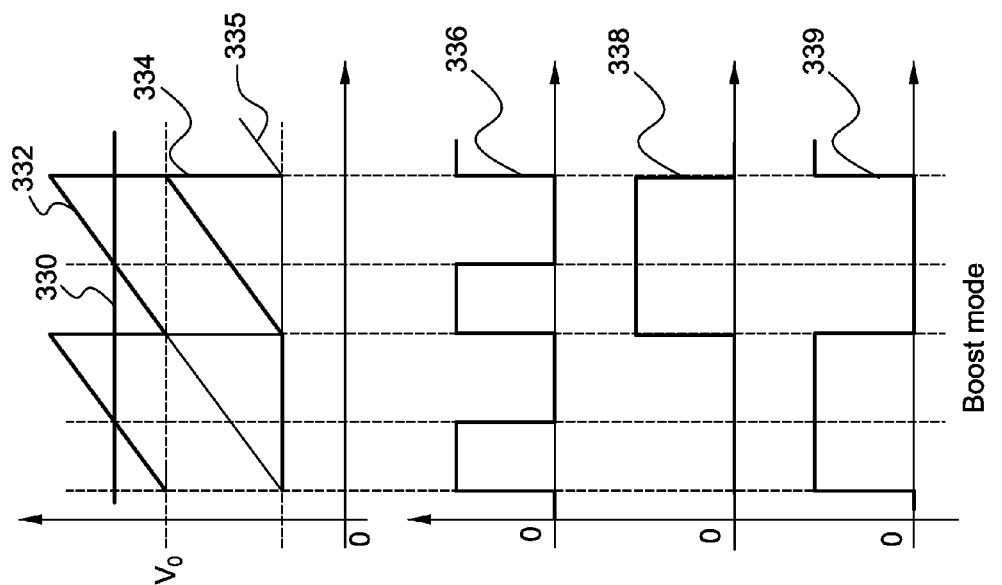
FIG. 12 Boost mode

BUCK-BOOST CONVERTER AND METHOD FOR REGULATION

BACKGROUND

Embodiments of the disclosure relate generally to a buck-boost converter and a method for regulating an output voltage, and more particularly to a buck-boost converter and a method for regulation through bucking or boosting an input voltage.

Busk-boost converters may be used to produce a constant DC output voltage, notwithstanding a DC input voltage which may be higher, lower, or equal to the output voltage. They may operate in a buck mode, a boost mode, and/or a buck-boost mode. The converter is considered to be in a buck mode of operation when the input voltage is higher than the output voltage, in a boost mode of operation when the input voltage is lower than the input voltage, and in a buck-boost mode of operation when the input voltage is approximately the same as the output voltage. The buck-boost mode of operation is a transition between the buck mode and the boost mode.

The buck-boost converter includes a number of switches. The output voltage is regulated through regulating open time of the switches. The buck-boost converter generates modulating signals based on duty cycles to regulate the switches. The buck-boost converter includes an error controller configured to generate the duty cycles. In the buck mode of operation, the output voltage Vout=D*Vin, wherein D is the duty cycle, Vin is the input voltage. In the boost mode of operation, the output voltage Vout=1/(1−D)*Vin. When the output voltage is equal to the input voltage, the duty cycle D is equal to 100% that is calculated from the expression of the output voltage in the buck mode, while the duty cycle D is equal to 0% that is calculated from the expression of the output voltage in the boost mode. Accordingly, the duty cycle generated by the error controller is jumped from 100% to 0% or from 0% to 100% during the transition between the buck mode and the boost mode, so that it is difficult to control the output voltage smoothly by one error controller during the transition.

It is desirable to provide a solution to address at least one of the above-mentioned problems.

BRIEF DESCRIPTION

In accordance with one embodiment disclosed herein, a buck-boost converter is provided. The buck-boost converter includes a buck-boost voltage converter circuit, an error controller and a buck-boost mode controller. The buck-boost voltage converter includes a plurality of switches. The error controller is coupled to the buck-boost voltage converter circuit and configured to provide a control signal based on a difference between an output voltage of the buck-boost voltage converter circuit and a reference voltage. The buck-boost mode controller is coupled to the error controller. The buck-boost mode controller determines switching duty cycles towards a switching regulation based on the control signal having at least three conditions: when DC is beyond a threshold value, apply one of buck regulation control and boost regulation control to switching regulation, where DC is a value of the control signal; when DC is not beyond and not substantially equal to the threshold value, apply the other of the buck regulation control and the boost regulation control to switching regulation; and when DC is substantially equal to the threshold value, apply buck-boost regulation control to switching regulation. The output voltage is regulated by the switching duty cycles.

In accordance with another embodiment disclosed herein, a method for regulation is provided. The method includes providing a control signal based on a difference between an output voltage of a buck-boost voltage converter circuit and a reference voltage. The method further includes determining switching duty cycles towards a switching regulation based on the control signal having at least three conditions: when DC is beyond a threshold value, applying one of buck regulation control and boost regulation control to switching regulation, where DC is a value of the control signal; when DC is not beyond and not substantially equal to the threshold value, applying the other of the buck regulation control and the boost regulation control to switching regulation; and when DC is substantially equal to the threshold value, applying buck-boost regulation control to switching regulation. The method further includes regulating the output voltage by the switching duty cycles.

DRAWINGS

These and other features and aspects of the present invention will become better understood when the following detailed description is read with reference to the accompanying drawings in which like characters represent like parts throughout the drawings, wherein:

FIGS. 8 to 10 are waveform diagrams of the modulating signals for the buck-boost converter of FIG. 1 in accordance with another embodiment;

FIGS. 12 to 14 are waveform diagrams of the modulating signals applied to the buck-boost voltage converter circuit of FIG. 11 in accordance with an embodiment.

DETAILED DESCRIPTION

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a", "one" and "an" do not denote a limitation of quantity, but rather denote the presence of at least one of the referenced items. The use of "including," "comprising", "having" or "contain" and variations thereof herein are meant to encompass the items listed thereafter and equivalents thereof as well as additional items. Although the terms "connected" and "coupled" are often used to describe physical or mechanical connections or couplings, they are not intended to be so restricted and can include electrical connections or couplings, whether direct or indirect.

Figure 1:
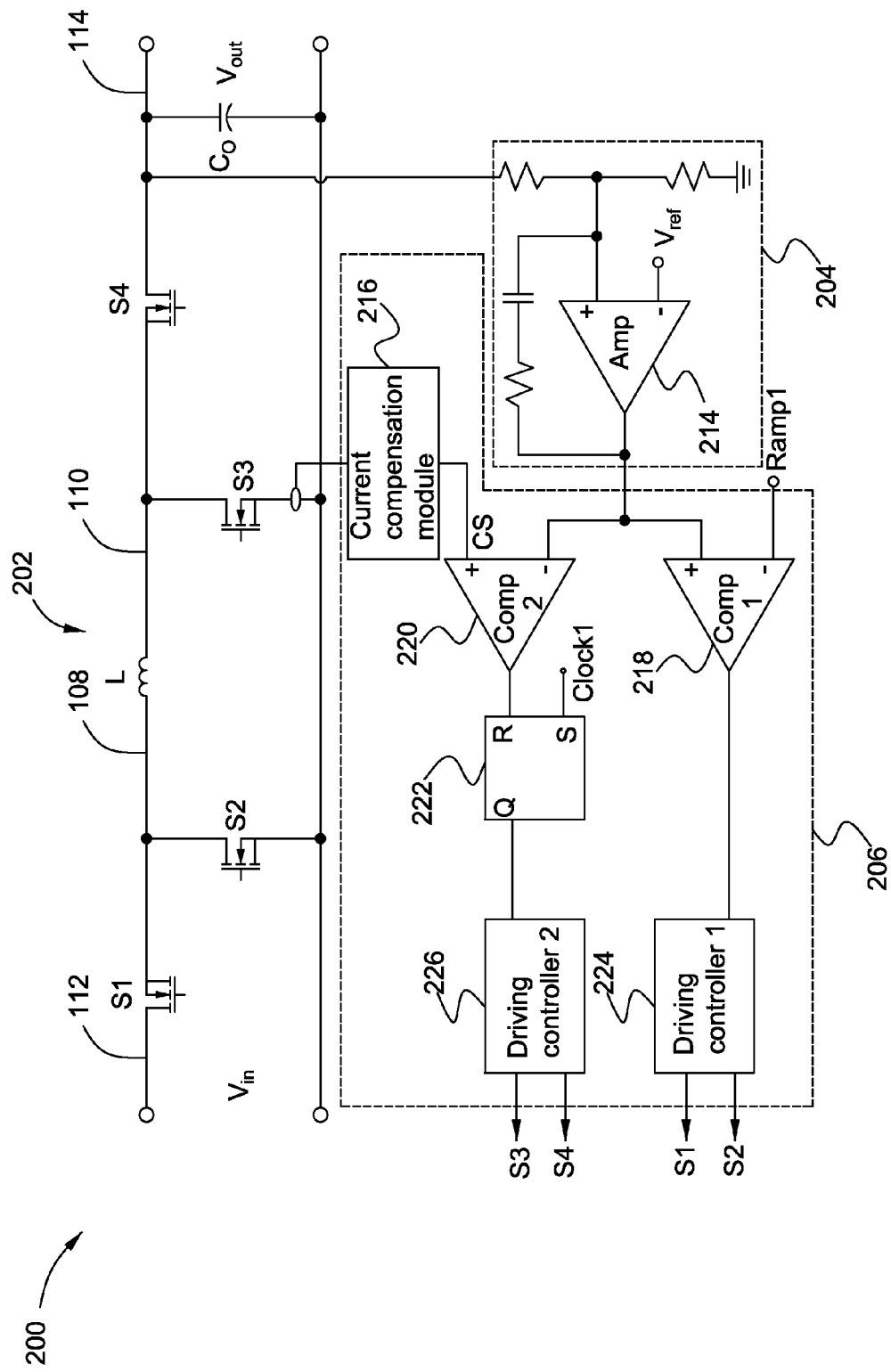
FIG. 1 is a schematic view of a buck-boost converter in accordance with an embodiment.

FIG. 1 illustrates a schematic view of a buck-boost converter 200 in accordance with an embodiment. The buck-boost converter 200 includes a buck-boost voltage converter circuit 202, an error controller 204 and a buck-boost mode controller 206. The buck-boost voltage converter circuit 202 includes a number of switches S1-S4, and an inductance L. The inductance L has a first connection 108 and a second connection 110. The inductance L may be provided by any type of inductor or set of inductors in any arrangement.

The switches S1-S4 are arranged in an H-bridge configuration in conjunction with inductor L. The first switch S1 is coupled to the first connection 108 of the inductance L and an input voltage source terminal 112, and configured to cause the first connection 108 of the inductance L to be controllable coupled to the input voltage source terminal 112. An input voltage Vin provided by an input voltage source is input from the input voltage source terminal 112. The second switch S2 is coupled to the first connection 108 of the inductance L and a ground, and configured to cause the first connection 108 of the inductance L to be controllable coupled to the ground. The third switch S3 is coupled to the second connection 110 of the inductance L and the ground, and configured to cause the second connection 110 of the inductance L to be controllable coupled to the ground. The fourth switch S4 is coupled to the second connection 110 of the inductance L and a load output terminal 114, and configured to cause the second connection 110 of the inductance L to be controllable coupled to the load output terminal 114. An output voltage Vout is output from the load output terminal 114 to a load coupled to the load output terminal 114. The switches S1-S4 may be electric switches. Each switch S1-S4 may include one or more FETs, MOSFETs, BJTs, JGBTs, diodes, or any combination of these.

In this embodiment, the buck-boost voltage converter circuit 202 further includes a capacitance Co coupled between the load output terminal 114 and the ground. The capacitance Co is configured to filter the output voltage Vout. The capacitance Co may include one or more capacitors connected in any configuration and in any way in the circuit which effectuates filtering of the output voltage Vout. Other filtering components may additionally be used. In some embodiments, a capacitance (not shown) is coupled between the input voltage source terminal 112 and the ground and configured to filter the input voltage Vin.

The error controller 104 is coupled to the buck-boost voltage converter circuit 102, and configured to provide a control signal based on a difference between the output voltage Vout of the buck-boost voltage converter circuit 102 and a reference voltage Vref. The error controller 104 is connected to the load output terminal 114 to receive the output voltage Vout. In another embodiment, a voltage divider (not shown) is employed to generate the feedback voltage (not shown) from the output voltage Vout, and the error controller 104 generates the control signal based on a difference between the feedback voltage and the reference voltage Vref. The reference voltage Vref is a desired output voltage.

The error controller 204 may be a digital circuit, an analog circuit or a combination of these, and the error controller 204 may process digital signals, analog signals or combination signals of these. For example, in one embodiment, the error controller 204 includes an analog-to-digital converter (ADC) configured to convert the output voltage Vout or other analog signals into digital signals. In one example, the error controller 204 includes a digital or analog error amplifier. The error controller 204 may include a PID (Proportion Integration Differentiation) controller, an error amplifier, or any other controller processing signals, such as proportion controller and PI (Proportion Integration) controller. In the illustrated embodiment, the error controller 204 includes an error amplifier 214 configured to amplify the difference between the output voltage Vout and the reference Vref. The amplified difference is provided to the buck-boost mode controller 206 as the control signal.

The buck-boost mode controller 206 is coupled to the error controller 204. The buck-boost mode controller 206 determines switching duty cycles towards a switching regulation based on the control signal having at least three conditions: when DC is beyond a threshold value, apply one of buck regulation control and boost regulation control to switching regulation, where DC is a value of the control signal; when DC is not beyond and not substantially equal to the threshold value, apply the other of the buck regulation control and the boost regulation control to switching regulation; when DC is substantially equal to the threshold value, apply buck-boost regulation control to switching regulation. Where "substantially equal" means within 1 to 2 percent of being "equal". The threshold value may be programmed, or generated by hardware equipment. The threshold value may be any value, such as positive number, negative number, or zero.

The output voltage Vout is regulated by the switching duty cycles. The buck-boost mode controller 206 generates modulating signals according to the switching duty cycles and the controlling modes to regulate the switches S1-S4. Accordingly the input voltage Vin is bucked or boosted through regulating the open time of each switch S1-S4 to obtain the desired output voltage Vout. The first switch S1 and the second switch S2 connected with the first switch S1 in series work in opposite statuses, that is to say, one of the first switch S1 and the second switch S2 is open while the other is closed. Similarly, the third switch S3 and the fourth switch S4 connected with the third switch S3 in series work in opposite statuses.

In this embodiment, the buck-boost mode controller 206 includes a current compensation module 216, a first comparator 218, a second comparator 220, a clock signal controller 222, a first driving controller 224, and a second driving controller 226. The current compensation module 216 is coupled to the buck-boost voltage converter circuit 202, and configured to receive a peak current from the buck-boost voltage converter circuit 202. In this embodiment, the current compensation module 216 is coupled to a pin of the third switch S3 to receive the peak current. In other embodiments, the current compensation module 216 may be coupled to a pin of another component in the buck-boost voltage converter circuit 202 to receive the peak current, such as a pin of the inductance L connected with the third switch S3 or a pin of the fourth switch S4 connected with the inductance L. In one embodiment, the current compensation module 216 may detect the peak current through one or more sensors. The current compensation module 216 is configured to generate a comparing signal CS based on the peak current from the buck-boost voltage converter circuit 202 and a direct current bias. The comparing signal CS is generated through adding the peak current and the direct current bias. In this embodiment, the peak current is added by the direct current bias and a slope compensation to obtain the comparing signal CS, so that the slope compensation can improve the stability of the switching duty cycles.

The buck-boost mode controller 206 is further configured to determine the switching duty cycles based on the comparing signal CS and the control signal. the first comparator 218 receives the control signal and a ramp signal, and compares the control signal and the ramp signal through a voltage control method to generate the switching duty cycle and the modulating signal for the first switch S1. The ramp signal may be pre-determined which may be a triangular wave, a sawtooth wave and so on. The first driving controller 224 generates the modulating signal for the second switch S2 according to the switching duty cycle and the modulating signal for the first switch S1, where the second switch S2 and the first switch S1 work in opposite statuses. The second comparator 220 receives the comparing signal and the control signal. The clock signal controller 222 sets a RS trigger according to a clock signal. The switching duty cycle and the modulating signal for the third switch S3 is generated through a peak current control method. The second driving controller 226 generates the modulating signal for the fourth switch S4 according to the switching duty cycle and the modulating signal for the third switch S3, where the fourth switch S4 and the third switch S3 work in opposite statuses. The peak current of the buck-boost voltage converter circuit 202 varies immediately once the input voltage Vin varies, so that the converter has quick response speed.

Figure 3:
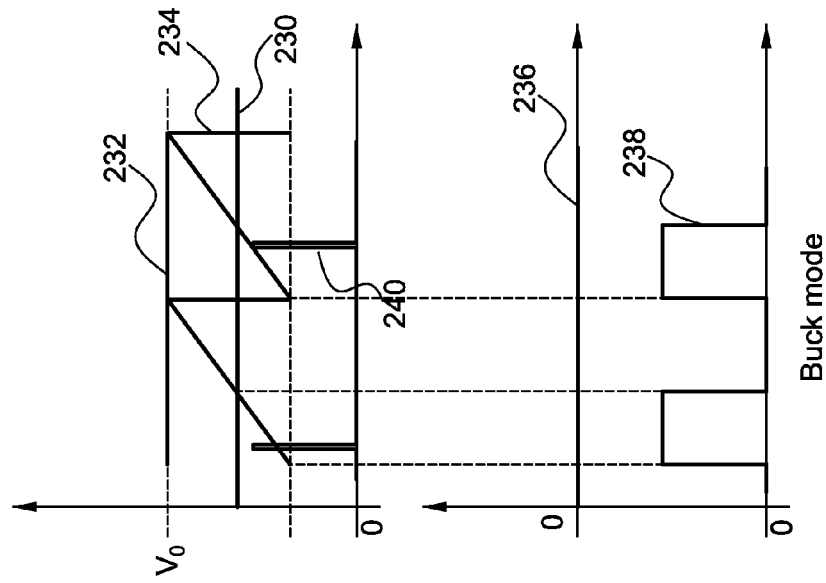
FIGS. 2 to 4 are waveform diagrams of the modulating signals for the buck-boost converter of FIG. 1 in accordance with an embodiment.
Figure 2:
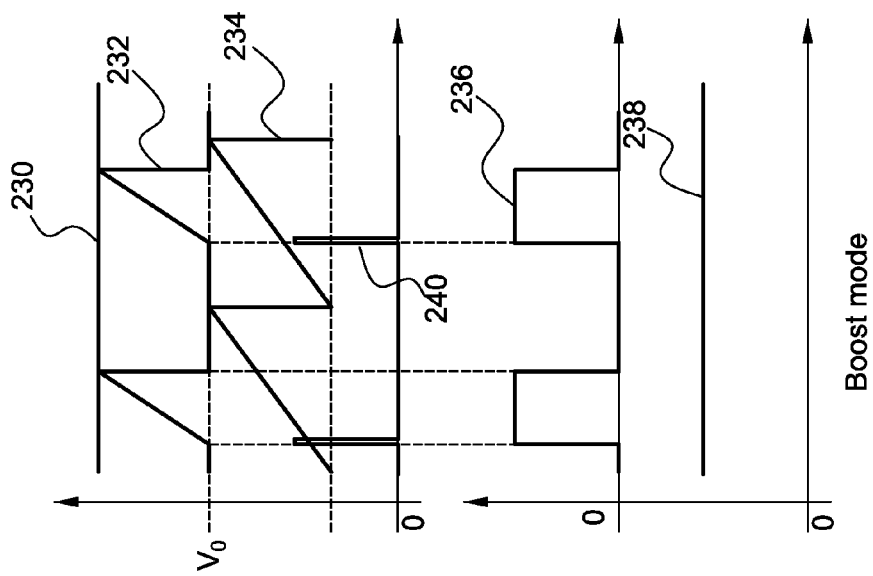
Figure 4:
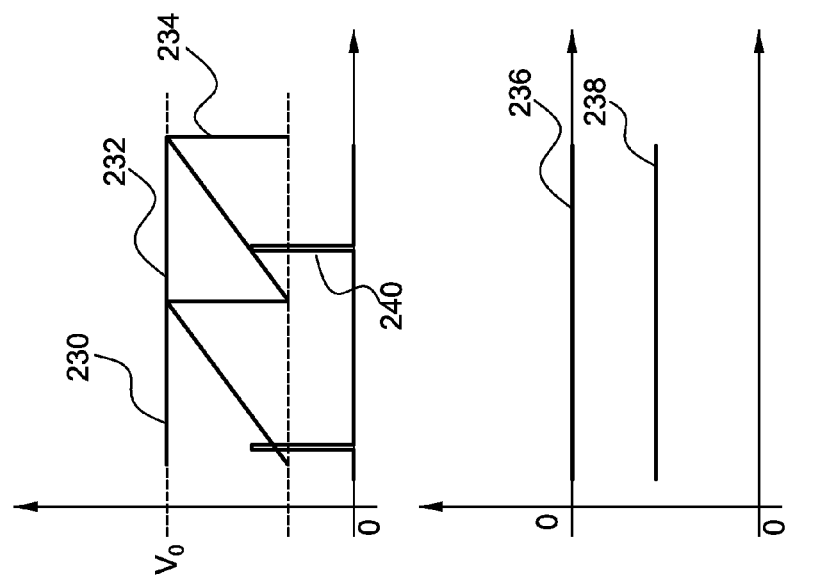

FIGS. 2 to 4 illustrate waveform diagrams of the modulating signals for the buck-boost converter 200 of FIG. 1 in accordance with an embodiment. FIG. 2 illustrates the waveform diagrams of the comparing signal 232, the ramp signal 234, the modulating signal 236 for the third switch S3, and the modulating signal 238 for the first switch S1 in the boost mode. FIG. 3 illustrates the waveform diagrams of the comparing signal 232, the ramp signal 234, the modulating signal 236 for the third switch S3, and the modulating signal 238 for the first switch S1 in the buck mode. FIG. 4 illustrates the waveform diagrams of the comparing signal 232, the ramp signal 234, the modulating signal 236 for the third switch S3, and the modulating signal 238 for the first switch S1 in the buck-boost mode. In this embodiment, a value of the direct current bias added to the peak current is equal to the maximum value $V_0$ of the ramp signal 234, so that the minimum value of the comparing signal 232 is equal to the maximum value $V_0$ of the ramp signal 234. The threshold value is equal to the direct current bias. In this embodiment, the maximum value $V_0$ of the ramp signal 234 is the threshold value. When the value DC of the control signal 230 is beyond the threshold value $V_0$, the buck-boost mode controller 206 applies the boost regulation control mode. When DC is not beyond and not substantially equal to the threshold value $V_0$, the buck-boost mode controller 206 applies the buck regulation control mode. When is substantially equal to the threshold value $V_0$, the buck-boost mode controller 206 applies the buck-boost regulation control mode. The buck-boost converter 200 can switch smoothly between the boost mode and the buck mode.

Referring to FIGS. 1 and 2, in the boost mode, the value DC of the control signal is beyond the threshold value $V_0$, and the modulating signal 236 for the third switch S3 is generated through the peak current control method. The third switch S3 is closed when a pulse of the clock signal 240 occurs. When the comparing signal 232 reaches the control signal 230, the third switch S3 is open until a next pulse of the clock signal 240 occurs. The fourth switch S4 and the third switch S3 work in opposite statuses. The control signal 230 and the ramp signal 234 are compared to generate the modulating signal 238 for the first switch S1. The first switch S1 is closed when the ramp signal 238 does not exceed the control signal 230. The first switch S1 is always closed and the second switch S2 is always open under the boost mode.

Referring to FIGS. 1 and 3, in the boost mode, the value DC of the control signal 230 is not beyond and not substantially equal to the threshold value $V_0$, and the third switch S3 is always open and the fourth switch S4 is always closed. The control signal 230 and the ramp signal 234 are compared to generate the modulating signal 238 for the first switch S1. The first switch S1 is closed when the ramp signal 234 does not exceed the control signal 230, and the first switch S1 is open when the ramp signal 234 exceeds the control signal 230. The second switch S2 and the first switch S1 work in opposite statuses.

Referring to FIGS. 1 and 4, in the buck-boost mode, the control signal 230 and the comparing signal 232 are equal to the threshold value $V_0$. The first switch S1 and the fourth switch S4 are closed, and the second switch S2 and the third switch S3 are open. The buck-boost voltage converter circuit 202 operates at a boundary between the buck mode and the boost mode.

Figure 6:
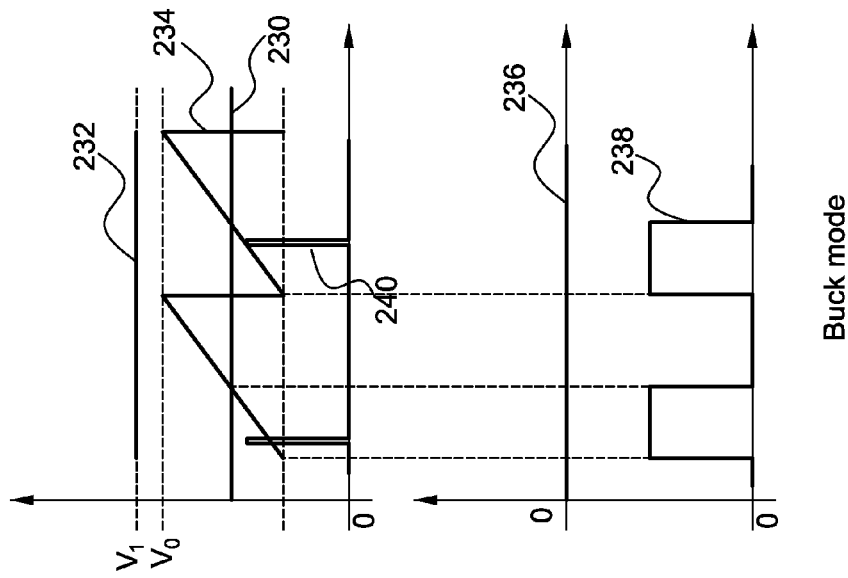
FIGS. 5 to 7 are waveform diagrams of the modulating signals for the buck-boost converter of FIG. 1 in accordance with another embodiment.
Figure 5:
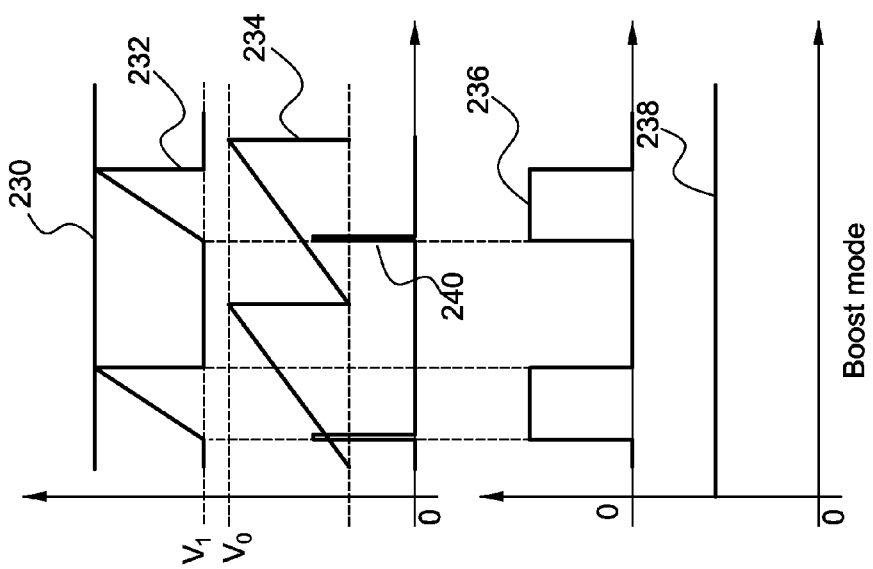
Figure 7:
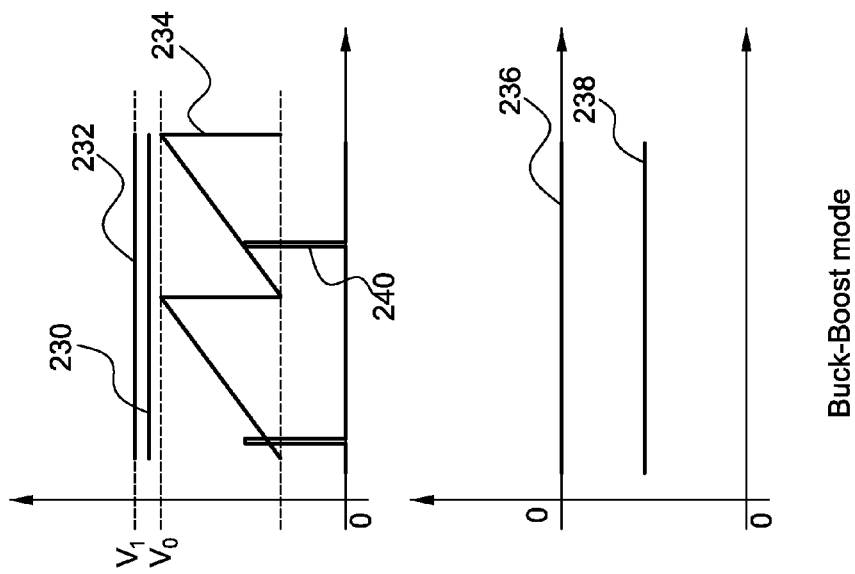

FIGS. 5 to 7 illustrate waveform diagrams of the modulating signals for the buck-boost converter 200 of FIG. 1 in accordance with another embodiment. FIG. 5 illustrates the waveform diagrams of the comparing signal 232, the ramp signal 234, the modulating signal 236 for the third switch S3, and the modulating signal 238 for the first switch S1 in the boost mode. FIG. 6 illustrates the waveform diagrams of the comparing signal 232, the ramp signal 234, the modulating signal 236 for the third switch S3, and the modulating signal 238 for the first switch S1 in the buck mode. FIG. 7 illustrates the waveform diagrams of the comparing signal 232, the ramp signal 234, the modulating signal 236 for the third switch S3, and the modulating signal 238 for the first switch S1 in the buck-boost mode.

In this embodiment, the value of the direct current bias added to the peak current is a little larger than the maximum value $V_0$ of the ramp signal 234, so that the minimum value $V_1$ of the comparing signal 232 is a little larger than the maximum value $V_0$ of the ramp signal 234. There is a dead band between the comparing signal 232 and the ramp signal 234. For example, the value of the direct current bias is 1%-2% larger than the maximum value $V_0$, so that the minimum value $V_1$ of the comparing signal 232 is 1%-2% larger than the maximum value $V_0$ of the ramp signal 234. In this embodiment, the minimum value $V_1$ of the comparing signal 232 is the threshold value. When the control signal is in the dead band, that is to say, the value DC of the control signal 230 is a value between the maximum value $V_0$ and the minimum value $V_1$, DC is substantially equal to the threshold value $V_1$, and the buck-boost mode controller 206 applies the buck-boost regulation control mode. When DC is beyond the threshold value $V_1$, the buck-boost mode controller 206 applies the boost regulation control mode. When DC is not beyond and not substantially equal to the threshold value $V_1$, that is to say DC is less than the maximum value $V_0$, the buck-boost mode controller 206 applies the buck regulation control mode.

The modulating signals 236 and 238 in the boost mode of FIG. 5 are similar to the modulating signals 236 and 238 of FIG. 2, respectively. The modulating signals 236 and 238 in the buck mode of FIG. 6 are similar to the modulating signals 236 and 238 of FIG. 3, respectively. The modulating signals 236 and 238 in the buck mode of FIG. 7 are similar to the modulating signals 236 and 238 of FIG. 4, respectively.

Figure 10:
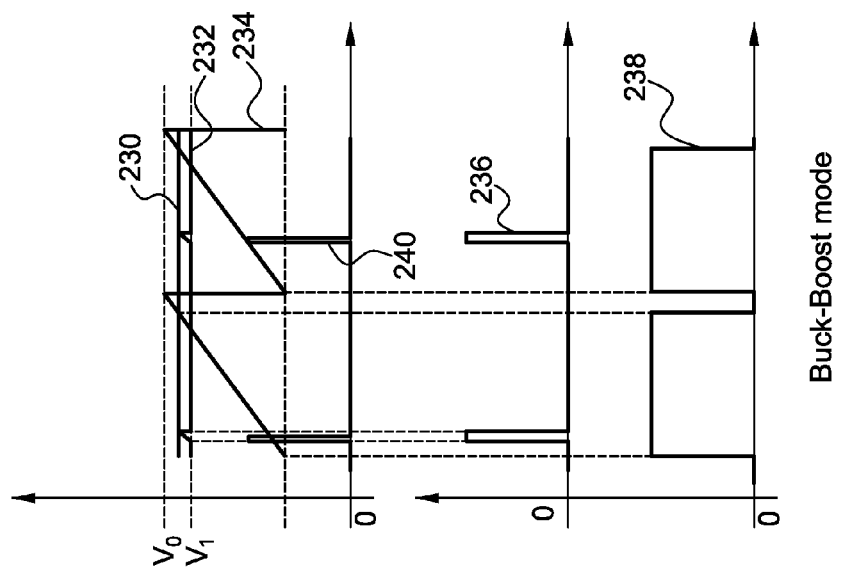

FIGS. 8 to 10 illustrate waveform diagrams of the modulating signals for the buck-boost converter 200 of FIG. 1 in accordance with another embodiment. FIG. 8 illustrates the waveform diagrams of the comparing signal 232, the ramp signal 234, the modulating signal 236 for the third switch S3, and the modulating signal 238 for the first switch S1 in the boost mode. FIG. 9 illustrates the waveform diagrams of the comparing signal 232, the ramp signal 234, the modulating signal 236 for the third switch S3, and the modulating signal 238 for the first switch S1 in the buck mode. FIG. 10 illustrates the waveform diagrams of the comparing signal 232, the ramp signal 234, the modulating signal 236 for the third switch S3, and the modulating signal 238 for the first switch S1 in the buck-boost mode.

In this embodiment, the value of the direct current bias added to the peak current is a little less than the maximum value $V_0$ of the ramp signal 234, so that the minimum value $V_1$ of the comparing signal 232 is a little less than the maximum value $V_0$ of the ramp signal 234. The comparing signal 232 has a little overlap with the ramp signal 234. For example, the value of the direct current bias is 1%-2% less than the maximum value $V_0$, so that the minimum value $V_1$ of the comparing signal 232 is 1%-2% less than the maximum value $V_0$ of the ramp signal 234. In this embodiment, the maximum value $V_0$ is the threshold value. When the value DC of the control signal 230 is a value between the maximum value $V_0$ and the minimum value $V_1$, DC is substantially equal to the threshold value $V_0$, and the buck-boost mode controller 206 applies the buck-boost regulation control mode. When DC is beyond the threshold value $V_0$, the buck-boost mode controller 206 applies the boost regulation control mode. When DC is not beyond and not substantially equal to the threshold value $V_0$, that is to say DC is less than the minimum value $V_1$, the buck-boost mode controller 206 applies the buck regulation control mode.

The modulating signals 236 and 238 in the boost mode of FIG. 8 are similar to the modulating signals 236 and 238 of FIG. 2, respectively. The modulating signals 236 and 238 in the buck mode of FIG. 9 are similar to the modulating signals 236 and 238 of FIG. 3, respectively. All of the switches S1-S4 are regulated in the buck-boost mode of FIG. 10. In each period, the comparing signal 230 reaches the control signal 230 from the minimum value $V_1$ in a short time since the control signal 230 is close to the minimum value $V_1$. Accordingly the third switch S3 is closed in the short time. In each period, the ramp signal 234 exceeds the control signal 230 in another short time. Accordingly, the first switch S1 is open in the short time.

Figure 11:
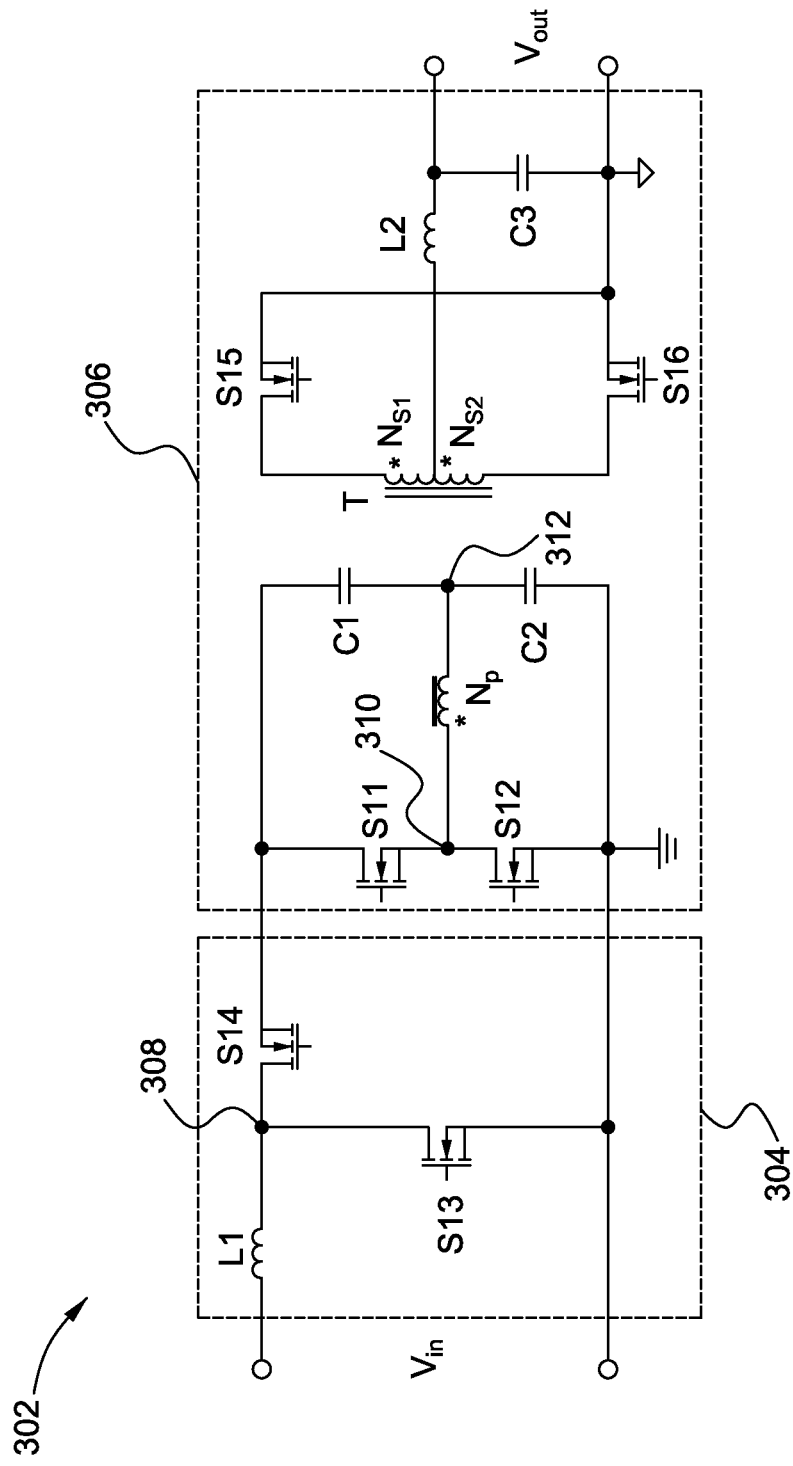
FIG. 11 is a schematic view of a buck-boost voltage converter circuit in accordance with another embodiment.

FIG. 11 illustrates a schematic view of a buck-boost voltage converter circuit 302 in accordance with another embodiment. The buck-boost voltage converter circuit 302 includes a boost circuit 304 and an isolated buck circuit 306 coupled to the boost circuit 304. The boost circuit 304 being positioned in front of the isolated buck circuit 306. The boost circuit 304 receives the input voltage Vin, and the isolated buck circuit 306 outputs the output voltage Vout. The boost circuit 304 includes an inductance L1, switches S13 and S14. Two terminals of the inductance L1 are respectively coupled to an input source and the switch S13. A terminal of the switch S14 is coupled to a connection 308 of the inductance L1 and the switch S13, and the other terminal of the switch S14 is coupled to the isolated buck circuit 306.

The buck circuit 306 is an isolated circuit which may electric isolates the input voltage Vin and the output voltage Vout. In this embodiment, the buck circuit 306 is a half-bridge circuit. The buck circuit 306 includes switches S11 and S12, capacitances C1 and C2, and a transformer T. The switch S11 and the switch S12 are connected with each other in series. The switch S11 is coupled to the switch S14 and the switch 12 is coupled to the switch S13. The capacitance C1 and the capacitance C2 are connected in series, and connected with the switches S11 and S12 in parallel. A terminal of a primary side $N_p$ of the transformer T is coupled to a connection 310 of the capacitance C1 and the capacitance C2, and the other terminal of the primary side $N_p$ is coupled to a connection 312 of the switch S1 and the switch S2. The output voltage Vout is output from a winding $N_{S1}$ or $N_{S2}$ of the transformer T. The buck circuit 306 further includes rectifiers S15 and S16 coupled respectively to the windings $N_{S1}$ and $N_{S2}$. In this example, the rectifiers S15 and S16 are switches. In another example, the rectifiers S15 and S16 may be diodes or other components. The buck circuit 306 includes filter inductance L2 and filter capacitor C3 to filter the output voltage Vout. In another embodiment, the buck circuit 306 may be any other isolated buck circuits, such as normal shock circuit, flyback circuit, bridge circuit, or push-pull circuit. The buck-boost voltage converter circuit 302 may be controlled by the error controller 204 and the buck-boost mode controller 206 of FIG. 1.

Figure 14:
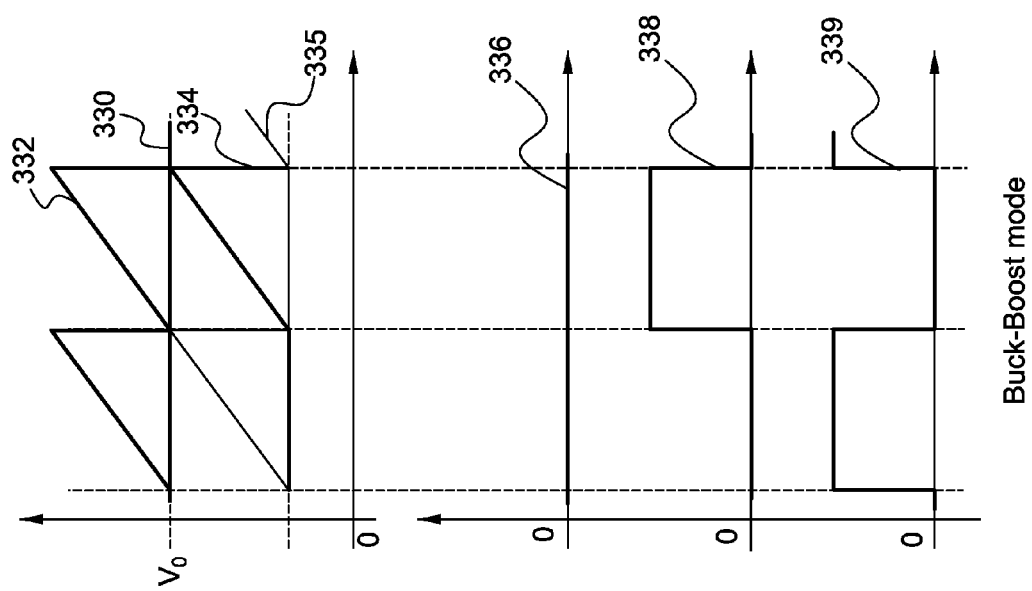

FIGS. 12 to 14 illustrate waveform diagrams of modulating signals applied to the buck-boost voltage converter circuit 302 of FIG. 11 in accordance with an embodiment. FIG. 12 illustrates the waveform diagram of the modulating signals in the boost mode. The control signal 330 is beyond the threshold value $V_0$. The control signal 330 is compared with the first comparing signal 332 to generate the modulating signal 336 for the switch S13. The switch S14 and the switch S13 work in opposite statuses. The control signal 330 is compared with the second comparing signal 334 to generate the modulating signal 338 for the switch S11. The switch S11 is open when the value of the second comparing signal 334 is constant. The switch S11 is closed when values of the comparing signal 334 vary and the control signal 330 is below the second comparing signal 334.

The wave of the third comparing signal 335 is similar to the wave of the second comparing signal 334. The third comparing signal 335 and the second comparing signal 334 are stagger in half period. Similar to the generation of the modulating signal 338 for the switch S11, the third comparing signal 335 and the control signal 330 are compared to generate the modulating signal 339 for the switch S12. The switching duty cycle of the modulating signals 338 and 339 are both 0.5. The period time of the modulating signals 338 and 339 are both twice as much as the period time of the modulating signal 336.

In the boost mode, the switches S13 and S14 of the boost circuit 304 are regulated to boost the input voltage Vin to a transition voltage that is higher than the output voltage Vout. The buck circuit 306 bucks the transition voltage from the boost circuit 304 via the transformer T to obtain the output voltage Vout. Accordingly, current flowing the buck circuit 306 is quite low due to the high transition voltage, so that the components of the buck circuit 306, which include the switches S11, S12, the transformer T and the rectifiers S15, S16, has small power loss.

FIG. 13 illustrates the waveform diagram of the modulating signals in the buck mode. The control signal 330 is below the threshold value $V_0$. The switch S13 is always open and the switch S14 is always closed. The control signal 330 is compared with the second comparing signal 334 to generate the modulating signal 338 for the switch S11. The switch S11 is open when the comparing signal 334 is constant. The switch S11 is closed when values of the comparing signal 334 vary and the comparing signal 334 is below the control signal 330. Otherwise, the switch S11 is open. Similar to the generation of the modulating signal 338, the control signal 330 is compared with the third comparing signal 335 to generate the modulating signal 339 for the switch S12. The buck-boost voltage converter circuit 302 works in the buck mode through regulating the switches S11 and S12.

FIG. 14 illustrates the waveform diagram of the modulating signals in the buck-boost mode. The control signal 330 is substantially equal to the threshold value $V_0$. The switch S13 is always open and the switch S14 is always closed. The switching duty cycles of the modulating signals 338 and 339 for the switches S11 and S12 are both 0.5. The switch S11 and the switch S12 are closed alternately.

The second comparing signal 334 and the third comparing signal 335 in FIGS. 12 to 14 are used for the half-bridge circuit in FIG. 11. In other embodiments, other comparing signals are used for corresponding isolated buck circuits.

A method for regulation includes providing a control signal based on a difference between an output voltage of a buck-boost voltage converter circuit and a reference voltage. In one embodiment, the control signal is generated based on integral and differential of the difference. In another embodiment, the difference is amplified to generate the control signal. The error controller 204 in FIG. 1 may be employed to generate the control signal.

The method further includes determining switching duty cycles towards a switching regulation based on the control signal. The buck-boost mode controller 206 in FIG. 1 may be employed to generate the switching duty cycles. The control signal has at least three conditions: when DC is beyond a threshold value, applying one of buck regulation control and boost regulation control to switching regulation, where DC is a value of the control signal; when DC is not beyond and not substantially equal to the threshold value, applying the other of the buck regulation control and the boost regulation control to switching regulation; and when DC is substantially equal to the threshold value, applying buck-boost regulation control to switching regulation. The output voltage is regulated by the switching duty cycles. The value DC of the control signal can vary linearly and continuously during the transition between the boost mode and the buck mode, so that the output voltage varies smoothly during the transition.

In one embodiment, when DC is beyond the threshold value, the switching duty cycle for the boost mode is generated, and the modulating signals for the switches are generated according to the switching duty cycle. The switches are regulated by the modulating signals to cause the buck-boost voltage converter circuit operating in the boost mode. The input voltage is boosted to obtain the desired output voltage. When DC is not beyond and not substantially equal to the threshold value, the switching duty cycle for the buck mode is generated, and the modulating signals are generated according to the switching duty to regulate the switches. The buck-boost voltage converter circuit operates in the buck mode by regulating the switches to buck the input voltage to obtain the desired output voltage. The buck-boost mode is a transition mode between the buck mode and the boost mode. In the buck-boost mode, the input voltage is close to the output voltage. The modulating signals may be PWM signals.

In another embodiment, the buck-boost voltage converter circuit works in the buck mode when DC is beyond the threshold value; the buck-boost voltage converter circuit works in the boost mode when DC is not beyond and not substantially equal to the threshold value; and the buck-boost voltage converter circuit works in the buck-boost mode when DC is substantially equal to the threshold value.

In one embodiment, the switching duty cycles are equal to absolute values of differences between DC and the threshold value. The threshold value may be a constant or any pre-programmed value. In one example, the threshold value is zero, and the switching duty cycle is equal to the absolute value of DC. In another embodiment, the switching duty cycle and the modulating signals are determined based on the control signal and one or more comparing signals. In one embodiment, determining the switching duty cycles includes generating a comparing signal based on peak current from the buck-boost voltage converter circuit and a direct current bias, and determining the switching duty cycles based on the comparing signal and the control signal. A first comparing signal, such as the comparing signal 232 in FIGS. 2 to 10, is generated by adding the peak current of the buck-boost voltage converter circuit and the direct current bias. The modulating signals for a pair of boost switches, such as the switches S3 and S4 in FIG. 1, are generated based on the first comparing signal and the control signal by the peak current control method. The modulating signals for a pair of buck switches, such as the switches S1 and S2 in FIG. 1, are generated based on a second comparing signal, such as the ramp signal 234 in FIGS. 2 to 10, and the control signal by the voltage control method. The second comparing signal may be pre-determined.

In one embodiment, the direct current bias is equal to a maximum value of the second comparing signal, so that the first comparing signal and the second comparing signal may be synchronous with no voltage overlap between. The first comparing signal may be initiated at the highest voltage level which is reached by the second comparing signal. The threshold value is a boundary value between the first comparing signal and the second comparing signal. In another embodiment, the direct current bias is a little larger than the maximum value of the second comparing signal. There is a dead band between the first comparing signal and the second comparing signal. The threshold value is a minimum value of the first comparing signal. When the control signal is in the dead band, the value DC of the control signal is regarded as substantially equal to the threshold value. In yet another embodiment, the direct current bias is a little less than the maximum value of the second comparing signal. There is a voltage overlap between the first comparing signal and the second comparing signal. The threshold value is the maximum value of the second comparing signal. When the control signal is in the voltage overlap, the value DC of the control signal is regarded as substantially equal to the threshold value.

In one embodiment, the buck-boost voltage converter circuit includes an inductance, a first switch, a second switch, a third switch and a fourth switch. The configuration of the buck-boost voltage converter circuit may be the configuration of the buck-boost voltage converter circuit shown in FIG. 1. The method further includes causing the first switch and the fourth switch to be open and causing the second switch and the third switch to be closed during an interval of each period before the buck regulation control, the boost regulation control or the buck-boost regulation control is provided. The interval is quite short, but longer than the dead time of the switches so as to eliminate the output voltage ripple when the input voltage is close to the output voltage. After the interval, the switches are regulated to work in the boost mode, the buck mode or the buck-boost mode. Accordingly, the switches are regulated periodically.

In another embodiment, the buck-boost voltage converter circuit includes a boost circuit and an isolated buck circuit coupled to the boost circuit. The boost circuit is positioned in front of the isolated buck circuit. The buck-boost voltage converter circuit may be the buck-boost voltage converter circuit 302 in FIG. 11. The buck circuit electric isolates the input voltage and the output voltage. In this embodiment, in the boost mode, the boost circuit in the front may boost the input voltage to a transition voltage higher than the output voltage, and the buck circuit bucks the transition voltage to the output voltage through a transformer. The transition voltage is high so that current flowing the buck circuit is low. Thus, the power loss of the buck circuit is low.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A buck-boost converter, comprising:
a buck-boost voltage converter circuit comprising a first plurality of switches, a second plurality of switches, and an inductor electrically coupled between said first plurality of switches and said second plurality of switches;
an error controller coupled to the buck-boost voltage converter circuit and configured to provide a control signal based on a difference between an output voltage of the buck-boost voltage converter circuit and a reference voltage; and
a buck-boost mode controller coupled to the error controller, the buck-boost mode controller comprising:
a current compensation module coupled to an output terminal of the inductor, the current compensation module configured to generate a comparing signal by adding a peak current measured at one of the second plurality of switches and a direct current bias;
a first driving controller configured to generate modulating signals for the first plurality of switches based on a comparison of the control signal to a ramp signal;
a second driving controller configured to generate modulating signals for the second plurality of switches based on a comparison of the comparing signal to the control signal;
wherein the buck-boost mode controller is configured to determine switching duty cycles for a switching regulation based on the comparing signal and the control signal having at least three conditions:
when a value of the control signal is beyond a direct current bias value, apply one of buck regulation control and boost regulation control to the switching regulation;
when the value of the control signal is less than the direct current bias value, apply the other of the buck regulation control and the boost regulation control to the switching regulation; and
when the value of the control signal is substantially equal to the direct current bias value, apply buck-boost regulation control to the switching regulation; and
wherein the output voltage is regulated by the switching duty cycles.

2. The buck-boost converter of claim 1, wherein the buck-boost mode controller is configured to determine, by a first comparator, the switching duty cycles for a pair of the switches based on a comparison of the control signal and a ramp signal, and determine, by a second comparator, the switching duty cycles for another pair of the switches based on a comparison of the control signal and the comparing signal.

3. The buck-boost converter of claim 1, wherein the buck-boost voltage converter circuit comprises a boost circuit and an isolated buck circuit coupled to the boost circuit, the boost circuit being positioned upstream from the isolated buck circuit.

4. A method for regulation, comprising:
generating, by an error controller, a control signal based on a difference between an output voltage of a buck-boost voltage converter circuit and a reference voltage, wherein the buck-boost voltage converter circuit includes a first plurality of switches, a second plurality of switches, and an inductor electrically coupled between the first plurality of switches and the second plurality of switches;
generating, by a buck-boost mode controller, a comparing signal by adding peak current measured at one of the second plurality of switches and a direct current bias;
generating, by a first driving controller, modulating signals for the first plurality of switches based on a comparison of the control signal to a ramp signal;
generating, by a second driving controller, modulating signals for the second plurality of switches based on a comparison of the comparing signal to the control signal;
determining switching duty cycles for a switching regulation based on the comparing signal and the control signal having at least three conditions:
when a value of the control signal is beyond a direct current bias value, applying one of buck regulation control and boost regulation control to the switching regulation;
when the value of the control signal is less than the direct current bias value, applying the other of the buck regulation control and the boost regulation control to the switching regulation; and
when the value of the control signal is substantially equal to the direct current bias value, applying buck-boost regulation control to the switching regulation; and
regulating the output voltage by the switching duty cycles.

5. The method of claim 4, wherein determining the switching duty cycles further comprises:
determining the switching duty cycles for a pair of switches based on a comparison of the control signal and a ramp signal; and
determining the switching duty cycles for another pair of switches based on a comparison of the control signal and the comparing signal.

6. The method of claim 4, wherein the buck-boost voltage converter circuit comprises a boost circuit and an isolated buck circuit coupled to the boost circuit, the boost circuit being positioned upstream from the isolated buck circuit.

* * * * *